Oct. 19, 1965  J. EGGERT ETAL  3,212,400
OBJECTIVE LENS CONSISTING OF FOUR INDEPENDENT LENS UNITS
Filed May 2, 1962
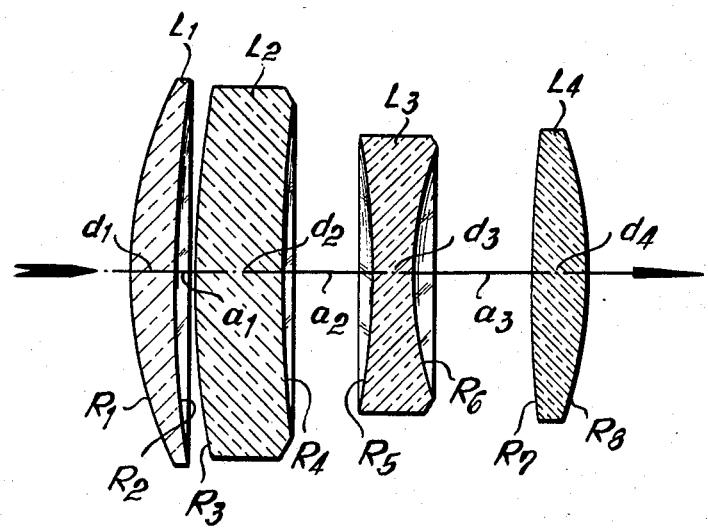
INVENTORS
JOACHIM EGGERT + PAUL SCHUHMANN United States Patent Office 3,212,400
Patented Oct. 19, 1965

3,212,400
OBJECTIVE LENS CONSISTING OF FOUR
INDEPENDENT LENS UNITS
Joachim Eggert and Paul Schuhmann, Braunschweig,
Germany, assignors to Voigtlander A.G., Braunschweig,
Germany, a corporation of Germany
Filed May 2, 1962, Ser. No. 191,890
Claims priority, application Germany, May 5, 1961,
V 20,616
7 Claims. (Cl. 88—57)

This invention relates to objective lenses for cameras and projectors and which have, at a relative aperture of not less than 1:2.8, an effective image field whose diameter is approximately sixty percent of the focal length. More particularly, the invention is directed to an objective lens of this type capable of fine compensation of individual image errors, having an improved quality of imaging through improved resolution and contrast, and affording considerable freedom of choice of optical glasses.

The objective lens of the present invention comprises four individual lenses so arranged that an unequal-sided negative lens is disposed between two condensing lens means, wherein the first lens means, proceeding in the direction of light through the objective from the side of the large conjugate to the side of the smaller conjugate, comprises a meniscus-shaped condensing front lens and a condensing meniscus lens, having a lower effective index of refraction than the front lens, spaced slightly rearwardly from the front lens. These two lenses represent, in the objective, a lens means of maximum axial thickness. Condensing lens means following the negative lens in the direction of such light rays comprises a bi-convex single lens.

The negative lens has its surface of maximum curvature facing the side of the shorter conjugate while, at the same time, the ratio of the radius of curvature of the front surface of the negative lens to the radius of curvature of the rear surface thereof ranges in value from 1.0 to 2.0, with the rear surface of the negative lens having a shorter radius of curvature than the last surface of the objective considered in the direction of light rays proceeding from the side of the longer conjugate to the side of the shorter conjugate. Objective lenses having four independent lenses, and embodying these general features, are known.

The invention will be best understood by reference to the single figure of the drawing which is a schematic axial sectional view through an objective embodying the invention and having, in the illustrated example, a focal length of $f=200$ mm. In the drawing, the lenses are designated L, the thicknesses of the lenses are designated $d$, the several radii of curvature are designated R, and the axial air gaps between lenses are designated $a$. The numeral suffixes which designate the several elements are arranged in ascending order in the direction of light rays through the objective from the side of the longer conjugate to the side of the shorter conjugate.

To provide an image of good quality, it is necessary to increase not only the resolving power but also the picture contrast in the area of the minutest picture details, if these are to appear perfectly in the image. As is well known, resolution and contrast in the lateral parts of the format are determined mainly by the astigmatic image shells and by the comatic correction.

In accordance with the present invention, it has been found that a very fine compensation of the individual image errors can be achieved, with a four-lens objective of the mentioned type by providing, in addition to the aforementioned generally known features, that the meniscus-shaped condensing lens $L_2$ which follows the front lens $L_1$ in the direction of light through the objective from the side of the longer conjugate to the side of the shorter conjugate, has such a curvature of its front and rear surfaces that the Gardner shape factor $\sigma_2$ representing the quotient of the arithmetical sum divided by the arithmetical difference of the radius $R_4$ of its rear surface and the radius $R_3$ of its front surface is within the range of $+1.3$ and $+2.3$. However, such fine compensation is attainable only when, simultaneously with the foregoing criterion, the ratio of the radius of curvature $R_1$ of the front surface of the front lens $L_1$ to the radius of curvature $R_3$ of the front surface of the lens $L_2$ has a value within the range from 0.3 to 0.8.

In accordance with the invention, further improvement of the quality of the image can be attained by so selecting the curvatures of the condensing rear lens $L_4$ that the corresponding Gardner shape factor $\sigma_4$ is within the limits of $-0.4$ and $-0.55$. In conjunction therewith, both of the outer faces of the overall objective should have radii of curvatures such that the sum of the absolute value of the two outer radii of curvature $(R_1+|R_8|)$ is less than 1.1 times the overall focal length. The air gap $a_2$ between the condensing front lenses $L_1$ and $L_2$ and the negative lens $L_3$ should, for best results, have a value which will deviate by no more than fifteen percent from the axial thickness $d_2$ of the lens $L_2$. The front surface of he negative lens has a curvature less than the last surface of the entire objective.

Bearing in mind the aforesaid combination of rules of the new design, a good objective lens may be obtained while permitting considerable freedom as to the choice of the various optical glasses. Insofar as the two most refractive condensing lenses are concerned, such as the front lens $L_1$ and the rear lens $L_4$, the glasses are so selected that the arithmetical mean of the refractive indices is within the range of 1.60 to 1.75 with the rear lens $L_4$ having an equal or higher refractive index than the front lens $L_1$. Likewise, the arithmetical mean of the $\nu$ values of such two most refractive condensing lens may be in the range of 44 to 60, with the $\nu$ value of the negative middle lens having a range of from 25 to 33.

The choice of glasses thus can be made in accordance with the foregoing design considerations, while taking into consideration the price structure or the correction requirements. This will be apparent from the four numerical examples given hereinafter. All these examples, with but a very slight difference, are basically in accordance with the axial section shown in the drawing figure and with the reference symbols employed therein. Thus, the reference character $n$ is used to designate the refractive indices for the $d$-line of the helium-spectrum, $\nu$ represents the Abbe numbers with reference to the $d$-line, $s'$ designates the intercept length on the image side, B1 represents the structural length of the objective length from the front surface to the rear surface, and $$\varphi = \frac{n'-n}{R}$$

are the refractive powers of the individual lens faces. In the examples, the numerical values are given, in each case, for an overall focal length of $f=100$ mm., whereas the drawing illustrates an objective which is designed for a focal length of $f=200$ mm.

Example 1

[1:2.5  f=100  s'=72.53  B1=49.83]

| | | | | |
|---|---|---|---|---|
| $R_1=+53.10$ | $d_1=5.94$ | $n_1=1.71300$ | $\nu_1=53.89$ | $\varphi_1=+1.343$ |
| $R_2=+308.51$ | $a_1=0.11$ | | | $\varphi_2=-0.231$ |
| $R_3=+98.74$ | $d_2=9.79$ | $n_2=1.56873$ | $\nu_2=63.12$ | $\varphi_3=+0.576$ |
| $R_4=+268.73$ | $a_2=10.48$ | | | $\varphi_4=-0.212$ |
| $R_5=-67.78$ | $d_3=4.24$ | $n_3=1.69895$ | $\nu_3=30.05$ | $\varphi_5=-1.031$ |
| $R_6=+41.09$ | $a_3=14.24$ | | | $\varphi_6=-1.701$ |
| $R_7=+159.17$ | $d_4=5.03$ | $n_4=1.71300$ | $\nu_4=53.89$ | $\varphi_7=+0.448$ |
| $R_8=-49.69$ | | | | $\varphi_8=+1.435$ |

In Example 1, a high refractive index lanthanum glass is used for the condensing lenses $L_1$ and $L_4$, this lanthanum glass having a refractive index ($n_1$ and $n_4$), in the range of from 1.70 to 1.75, with both lenses $L_1$ and $L_4$ being made of the same glass. The Abbe values $\nu_1$ and $\nu_4$ of the lenses $L_1$ and $L_4$ range from 50 to 60, whereas the Abbe value $\nu_3$ of the negative middle lens $L_3$ is from 28 to 33. The refractive index $n_3$ of the negative lens $L_3$ is lower than the arithmetical mean $$\frac{(n_1+n_4)}{2}$$

of the refractive indices of the two condensing lenses $L_1$ and $L_4$.

In accordance with the aforesaid features, the following results:

$$\sigma_2=\frac{R_4+R_3}{R_4-R_3}=\frac{367.47}{169.99}=+2.162$$

$$\frac{R_1}{R_3}=\frac{53.10}{98.74}=0.538$$

$$\sigma_4=\frac{R_8+R_7}{R_8-R_7}=\frac{+109.48}{-208.86}=-0.524$$

$$R_1+|R_8|=102.79<1.1f$$

$$a_2-d_2=+0.69=0.07d_2$$

Example 2

[1:2.8  f=100  s'=69.94  B1=45.18]

| | | | | |
|---|---|---|---|---|
| $R_1=+42.85$ | $d_1=5.50$ | $n_1=1.65844$ | $\nu_1=50.84$ | $\varphi_1=+1.537$ |
| $R_2=+213.74$ | $a_1=0.13$ | | | $\varphi_2=-0.308$ |
| $R_3=+86.46$ | $d_2=9.24$ | $n_2=1.52300$ | $\nu_2=59.6$ | $\varphi_3=+0.605$ |
| $R_4=+293.23$ | $a_2=9.18$ | | | $\varphi_4=-0.178$ |
| $R_5=-65.99$ | $d_3=3.51$ | $n_3=1.76182$ | $\nu_3=26.52$ | $\varphi_5=-1.154$ |
| $R_6=+38.36$ | $a_3=11.18$ | | | $\varphi_6=-1.986$ |
| $R_7=+125.37$ | $d_4=6.44$ | $n_4=1.70150$ | $\nu_4=41.0$ | $\varphi=+0.559$ |
| $R_8=-48.19$ | | | | $\varphi=+1.456$ |

In the objective lens of Example 2, the rear lens $L_4$ comprises a relatively high refractive index heavy baryta flint glass. The arithmetical mean of the refractive indices $n_1$ and $n_4$ of lenses $L_1$ and $L_4$, which is 1.68, is within the range of 1.60 to 1.70, and the refractive index $n_4$ of the lens $L_4$ exceeds that of the lens $L_1$ by 0.043. The arithmetical mean of the Abbe values $\nu_1$ and $\nu_4$, which is 45.92, is within the range of 44 to 50, while the Abbe value $\nu_3$ of the middle lens is 26.52 and thus within the range of 25 to 28. The refractive index $n_3$ of the lens $L_3$ is higher than the mean of the refractive indices of lens $L_1$ and $L_4$.

From the foregoing, the following results:

$$\sigma_2=+1.836$$

$$\frac{R_1}{R_3}=0.496$$

$$\sigma_4=-0.445$$

$$R_1+|R_8|=91.04<1.1f$$

$$a_2-d_2=-0.06=0.006d_2$$

Example 3

[1:2.5  f=100  s'=68.86  B1=50.57]

| | | | | |
|---|---|---|---|---|
| $R_1=+48.650$ | $d_1=5.9$ | $n_1=1.63854$ | $\nu_1=55.48$ | $\varphi_1=+1.313$ |
| $R_2=+282.669$ | $a_1=0.11$ | | | $\varphi_2=-0.226$ |
| $R_3=+88.796$ | $d_2=10.85$ | $n_2=1.63854$ | $\nu_2=55.48$ | $\varphi_3=+0.719$ |
| $R_4=+282.269$ | $a_2=10.40$ | | | $\varphi_4=-0.226$ |
| $R_5=-68.275$ | $d_3=4.20$ | $n_3=1.72830$ | $\nu_3=28.66$ | $\varphi_5=-1.067$ |
| $R_6=+39.928$ | $a_3=14.12$ | | | $\varphi_6=-1.824$ |
| $R_7=+162.688$ | $d_4=4.99$ | $n_4=1.71700$ | $\nu_4=47.90$ | $\varphi_7=+0.441$ |
| $R_8=-49.606$ | | | | $\varphi_8=+1.445$ |

In Example 3, the arithmeical means of the refractive indices of lenses $L_1$ and $L_4$ is 1.678, which is within the range of 1.60 and 1.70. The refractive index of lens $L_4$ exceeds that of lens $L_1$ by 0.078. The arithmetical means of the Abbe values $\nu_1$ and $\nu_4$, which is 51.69, is within the range of 50 and 60, while the Abbe value of lens $L_3$ is within the range of 28 to 33. The refractive index of lens $L_3$ is higher than the mean of the refractive indices of lenses $L_1$ and $L_4$. With the foregoing factors, the following result is obtained:

$$\sigma_2=+1.918$$

$$\frac{R_1}{R_3}=0.548$$

$$\sigma_4=-0.533$$

$$R_1+|R_8|=98.256<1.1f$$

$$a_2-d_2=-0.45=0.04d_2$$

Example 4

[1:2.8  f=100  s'=72.70  B1=43.37]

| | | | | |
|---|---|---|---|---|
| $R_1=+42.03$ | $d_1=4.40$ | $n_1=1.62299$ | $\nu_1=60.29$ | $\varphi_1=+1.482$ |
| $R_2=+199.95$ | $a_1=0.11$ | | | $\varphi_2=-0.312$ |
| $R_3=+88.27$ | $d_2=9.81$ | $n_2=1.52300$ | $\nu_2=59.6$ | $\varphi_3=+0.593$ |
| $R_4=+278.54$ | $a_2=10.25$ | | | $\varphi_4=-0.188$ |
| $R_5=-59.68$ | $d_3=2.61$ | $n_3=1.72151$ | $\nu_3=29.28$ | $\varphi_5=-1.209$ |
| $R_6=+38.08$ | $a_3=10.55$ | | | $\varphi_6=-1.895$ |
| $R_7=+118.60$ | $d_4=5.64$ | $n_4=1.66892$ | $\nu_4=44.98$ | $\varphi_7=+0.564$ |
| $R_8=-44.41$ | | | | $\varphi_8=+1.506$ |

The objective of Example 4 comprises a very simple glass combination. The means refractive indices of the condensing lenses $L_1$ and $L_4$ is 1.646, which is within the range of 1.60 to 1.70. The refractive index of lens $L_4$ exceeds that of lens $L_1$ by 0.0459. The arithmetical mean of the Abbe values of lenses $L_1$ and $L_4$ is 52.64, which is within the range of 50 to 60, while the Abbe value of the middle lens $L_3$ is 29.28 which is within the range of 28 to 33. The refractive index of lens $L_3$ is higher than the mean of the refractive indices of lens $L_1$ and $L_4$. With these values, the following is obtained:

$$\sigma_2=+1.928$$

$$\frac{R_1}{R_3}=7.406$$

$$\sigma_4=-0.455$$

$$R_1+|R_8|=86.44<1.1f$$

$$a_2-d_2=+0.44=0.045d_2$$

While specific embodiments of the invention have been shown and described to illustrate the application of the principles of the invention, it will be understood that the invention may be embodied otherwise without departing from such principles.

What is claimed is:

1. An objective with only four air-spaced single lenses comprising, proceeding from the longer conjugate toward the shorter conjugate, a meniscus-shaped condensing front lens followed by a second meniscus-shaped condensing lens having an index of refraction lower than that of said condensing front lens and separated from the latter by a relatively short air gap, the second condensing meniscus lens having an axial thickness which is a maximum for the entire objective; an unequal-sided negative lens and a biconvex condensing lens following said second lens, the negative lens having its surface of maximum curvature facing the side of the shorter conjugate, and the absolute value of the ratio of the radius of its front surface to the radius of its rear surface being between 1.0 and 2.0, the front surface of said negative lens having a curvature less than the last surface of the entire objective and the rear surface of said negative lens having a shorter radius of curvature than the last surface of the entire objective, and the Gardner shape factor of said second condensing meniscus lens $$\sigma_2 = \frac{R_4 + R_3}{R_4 - R_3}$$

being between 1.3 and 2.3, the ratio of the radius of curvature of the front surface of said front lens to the radius of curvature of the front surface of said second lens being between 0.3 and 0.8, the Gardner shape factor $$\sigma_4 = \frac{R_8 + R_7}{R_8 - R_7}$$

of the rear lens being between −0.4 and −0.55, and the sum of the absolute values of the radii of the two outermost surfaces of the objective $R_1 + R_8$ being less than 1.1 times the overall focal length of the objective, the axial air gap between said second lens and said negative lens having a value within fifteen percent of the value of the axial thickness of said second lens, and the arithmetical mean $$\frac{n_1 + n_4}{2}$$

of the refractive indices of said front lens and said biconvex condensing lens, which are the condensing lenses having the highest index of the fraction, being from 1.60 to 1.75, and the refractive index of said biconvex condensing lens being equal to or greater than that of said front lens.

2. An objective as claimed in claim 1, in which said front lens and said biconvex lens have higher indices of refraction than said second lens, and the arithmetical mean of the Abbe numbers of said first lens and said biconvex lens is between 44 and 60, with the Abbe number of said negative lens being between 25 and 33.

3. An objective as claimed in claim 1, in which the refractive index of said negative lens is less than the arithmetical mean of the refractive indices of said front lens and said biconvex lens.

4. An objective as claimed in claim 1 wherein, for a focal length of $f=100$ mm., the objective has the following physical data, wherein $s'$ designates the intercept length on the image side, B1 represents the structural length of the objective from the front surface to the rear surface, $R_1$ and $R_2$ represent the radii of curvature of the front and rear surfaces of said front lens, $d_1$ represents the thickness of said front lens, $n_1$ designates the refractive index of said front lens, $\nu_1$ represents the Abbe number of said front lens, and $\varphi_1$ and $\varphi_2$ respectively represent the refractive powers of the front and rear faces of said front lens; $a_1$ represents the gap between said front lens and said second lens, $R_3$ and $R_4$ respectively represent the radii of the curvature of the front and rear faces of said second lens, $d_2$ represents the thickness of said second lens, $n_2$ represents the refractive index of said second lens, $\nu_2$ represents the Abbe number of said second lens, and $\varphi_3$ and $\varphi_4$ respectively represent the refractive powers of the front and rear faces of said second lens; $a_2$ represents the air gap between said second lens and said negative lens, $R_5$ and $R_6$ respectively represent the radii of curvature of the front and rear faces of said negative lens, $d_3$ represents the thickness of said negative lens, $n_3$ represents the refractive index of said negative lens, $\nu_3$ represents the Abbe number of said negative lens, and $\varphi_6$ and $\varphi_7$ respectively represent the refractive powers of the front and rear faces of said negative lens; $a_3$ represents the air gap between said negative lens and said biconvex lens, $R_7$ and $R_8$ respectively represent the radii of the curvature of the front and rear faces of said biconvex lens, $d_4$ represents the thickness of said biconvex lens, $n_4$ represents the refractive index of said biconvex lens, $\nu_4$ represents the Abbe number of said biconvex lens, and $\varphi_7$ and $\varphi_8$ respectively represent the refractive powers of the front and rear faces of said biconvex lens:

[1 : 2.5   $f=100$   $s'=72.53$   B1=49.83]

| | | | | |
|---|---|---|---|---|
| $R_1=+53.10$ | $d_1=5.94$ | $n_1=1.71300$ | $\nu_1=53.89$ | $\varphi_1=+1.343$ |
| $R_2=+308.51$ | | | | $\varphi_2=-0.231$ |
| | $a_1=0.11$ | | | |
| $R_3=+98.74$ | | | | $\varphi_3=+0.576$ |
| | $d_2=9.79$ | $n_2=1.56873$ | $\nu_2=63.12$ | |
| $R_4=+268.73$ | | | | $\varphi_4=-0.212$ |
| | $a_2=10.48$ | | | |
| $R_5=-67.78$ | | | | $\varphi_5=-1.031$ |
| | $d_3=4.24$ | $n_3=1.69895$ | $\nu_3=30.05$ | |
| $R_6=+41.09$ | | | | $\varphi_6=-1.701$ |
| | $a_3=14.24$ | | | |
| $R_7=+159.17$ | | | | $\varphi_7=+0.448$ |
| | $d_4=5.03$ | $n_4=1.71300$ | $\nu_4=53.89$ | |
| $R_8=-49.69$ | | | | $\varphi_8=+1.435$ |

5. An objective lens as claimed in claim 1 wherein, for a focal length of $f=100$ mm., the objective has the following physical data, wherein $s'$ designates the intercept length on the image side, B1 represents the structural length of the objective from the front surface to the rear surface, $R_1$ and $R_2$ represent the radii of curvature of the front and rear surfaces of said front lens, $d_1$ represents the thickness of said front lens, $n_1$ designates the refractive index of said front lens, $\nu_1$ represents the Abbe number of said front lens, and $\varphi_1$ and $\varphi_2$ respectively represent the refractive powers of the front and rear faces of said front lens; $a_1$ represents the gap between said front lens and said second lens, $R_3$ and $R_4$ respectively represent the radii of the curvature of the front and rear faces of said second lens, $d_2$ represents the thickness of said second lens, $n_2$ represents the refractive index of said second lens, $\nu_2$ represents the Abbe number of said second lens, and $\varphi_3$ and $\varphi_4$ respectively represent the refractive powers of the front and rear faces of said second lens; $a_2$ represents the air gap between said second lens and said negative lens, $R_5$ and $R_6$ respectively represent the radii of curvature of the front and rear faces of said negative lens, $d_3$ represents the thickness of said negative lens, $n_3$ represents the refractive index of said negative lens, $\nu_3$ represents the Abbe number of said negative lens, and $\varphi_6$ and $\varphi_7$ respectively represent the refractive powers of the front and rear faces of said negative lens; $a_3$ represents the air gap between said negative lens and said biconvex lens, $R_7$ and $R_8$ respectively represent the radii of the curvature of the front and rear faces of said biconvex lens, $d_4$ represents the thickness of said biconvex lens, $n_4$ represents the refractive index of said biconvex lens, $\nu_4$ represents the Abbe number of said biconvex lens, and $\varphi_7$ and $\varphi_8$ respectively represent the refractive powers of the front and rear faces of said biconvex lens:

[1:2.8  $f=100$  $s'=69.94$  B1=45.18]

| | | | | |
|---|---|---|---|---|
| $R_1=+42.85$ | $d_1=5.50$ | $n_1=1.65844$ | $\nu_1=50.84$ | $\varphi_1=+1.537$ |
| $R_2=+213.74$ | $a_1=0.13$ | | | $\varphi_2=-0.308$ |
| $R_3=+86.46$ | $d_2=9.24$ | $n_2=1.52300$ | $\nu_2=59.6$ | $\varphi_3=+0.605$ |
| $R_4=+293.23$ | $a_2=9.18$ | | | $\varphi_4=-0.178$ |
| $R_5=-65.99$ | $d_3=3.51$ | $n_3=1.76182$ | $\nu_3=26.52$ | $\varphi_5=-1.154$ |
| $R_6=+38.36$ | $a_3=11.18$ | | | $\varphi_6=-1.986$ |
| $R_7=+125.37$ | $d_4=6.44$ | $n_4=1.70150$ | $\nu_4=41.0$ | $\varphi_7=+0.559$ |
| $R_8=-48.19$ | | | | $\varphi_8=+1.456$ |

6. An objective lens as claimed in claim 1 wherein, for a focal length of $f=100$ mm., the objective has the following physical data, wherein $s'$ designates the intercept length on the image side, B1 represents the structural length of the objective from the front surface to the rear surface, $R_1$ and $R_2$ represent the radii of curvature of the front and rear surfaces of said front lens, $d_1$ represents the thickness of said front lens, $n_1$ designates the refractive index of said front lens, $\nu_1$ represents the Abbe number of said front lens, and $\varphi_1$ and $\varphi_2$ respectively represent the refractive powers of the front and rear faces of said front lens; $a_1$ represents the gap between said front lens and said second lens, $R_3$ and $R_4$ respectively represent the radii of the curvature of the front and rear faces of said second lens, $d_2$ represents the thickness of said second lens, $n_2$ represents the refractive index of said second lens, $\nu_2$ represents the Abbe number of said second lens, and $\varphi_3$ and $\varphi_4$ respectively represent the refractive powers of the front and rear faces of said second lens; $a_2$ represents the air gap between said second lens and said negative lens, $R_5$ and $R_6$ respectively represent the radii of curvature of the front and rear faces of said negative lens, $d_3$ represents the thickness of said negative lens, $n_3$ represents the refractive index of said negative lens, $\nu_3$ represents the Abbe number of said negative lens, and $\varphi_6$ and $\varphi_7$ respectively represent the refractive powers of the front and rear faces of said negative lens; $a_3$ represents the air gap between said negative lens and said biconvex lens, $R_7$ and $R_8$ respectively represent the radii of the curvature of the front and rear faces of said biconvex lens, $d_4$ represents the thickness of said biconvex lens, $n_4$ represents the refractive index of said biconvex lens, $\nu_4$ represents the Abbe number of said biconvex lens, and $\varphi_7$ and $\varphi_8$ respectively represent the refractive powers of the front and rear faces of said biconvex lens:

[1:2.5  $f=100$  $s'=68.86$  B1=50.57]

| | | | | |
|---|---|---|---|---|
| $R_1=+48.650$ | $d_1=5.9$ | $n_1=1.63854$ | $\nu_1=55.48$ | $\varphi_1=+1.313$ |
| $R_2=+282.669$ | $a_1=0.11$ | | | $\varphi_2=-0.226$ |
| $R_3=+88.796$ | $d_2=10.85$ | $n_2=1.63854$ | $\nu_2=55.48$ | $\varphi_3=+0.719$ |
| $R_4=+282.269$ | $a_2=10.40$ | | | $\varphi_4=-0.226$ |
| $R_5=-68.275$ | $d_3=4.20$ | $n_3=1.72830$ | $\nu_3=28.66$ | $\varphi_5=-1.067$ |
| $R_6=+39.928$ | $a_3=14.12$ | | | $\varphi_6=-1.824$ |
| $R_7=+162.688$ | $d_4=4.99$ | $n_4=1.71700$ | $\nu_4=47.90$ | $\varphi_7=+0.441$ |
| $R_8=-49.606$ | | | | $\varphi_8=+1.445$ |

7. An objective as claimed in claim 1 wherein, for a focal length of $f=100$ mm., the objective has the following physical data, wherein $s'$ designates the intercept length on the image side, B1 represents the structural length of the objective from the front surface to the rear surface, $R_1$ and $R_2$ represent the radii of curvature of the front and rear surfaces of said front lens, $d_1$ represents the thickness of said front lens, $n_1$ designates the refractive index of said front lens, $\nu_1$ represents the Abbe number of said front lens, and $\varphi_1$ and $\varphi_2$ respectively represent the refractive powers of the front and rear faces of said front lens; $a_1$ represents the gap between said front lens and said second lens, $R_3$ and $R_4$ respectively represent the radii of the curvature of the front and rear faces of said second lens, $d_2$ represents the thickness of said second lens, $n_2$ represents the refractive index of said second lens, $\nu_2$ represents the Abbe number of said second lens, and $\varphi_3$ and $\varphi_4$ respectively represent the refractive powers of the front and rear faces of said second lens; $a_2$ represents the air gap between said second lens and said negative lens, $R_5$ and $R_6$ respectively represent the radii of curvature of the front and rear faces of said negative lens, $d_3$ represents the thickness of said negative lens, $n_3$ represents the refractive index of said negative lens, $\nu_3$ represents the Abbe number of said negative lens, and $\varphi_6$ and $\varphi_7$ respectively represent the refractive powers of the front and rear faces of said negative lens; $a_3$ represents the air gap between said negative lens and said biconvex lens, $R_7$ and $R_8$ respectively represent the radii of the curvature of the front and rear faces of said biconvex lens, $d_4$ represents the thickness of said biconvex lens, $n_4$ represents the refractive index of said biconvex lens, $\nu_4$ represents the Abbe number of said biconvex lens, and $\varphi_7$ and $\varphi_8$ respectively represent the refractive powers of the front and rear faces of said biconvex lens:

[1: 2.8  $f=100$  $s'=72.70$  B1=43.37]

| | | | | |
|---|---|---|---|---|
| $R_1=+42.03$ | $d_1=4.40$ | $n_1=1.62299$ | $\nu_1=60.29$ | $\varphi_1=+1.482$ |
| $R_2=+199.95$ | $a_1=0.11$ | | | $\varphi_2=-0.312$ |
| $R_3=+88.27$ | $d_2=9.81$ | $n_2=1.52300$ | $\nu_2=59.6$ | $\varphi_3=+0.593$ |
| $R_4=+278.54$ | $a_2=10.25$ | | | $\varphi_4=-0.188$ |
| $R_5=-59.68$ | $d_3=2.61$ | $n_3=1.72151$ | $\nu_3=29.28$ | $\varphi_5=-1.209$ |
| $R_6=+38.08$ | $a_3=10.55$ | | | $\varphi_6=-1.895$ |
| $R_7=+118.60$ | $d_4=5.64$ | $n_4=1.66892$ | $\nu_4=44.98$ | $\varphi_7=+0.564$ |
| $R_8=-44.41$ | | | | $\varphi_8=+1.506$ |

References Cited by the Examiner

UNITED STATES PATENTS

| | | | |
|---|---|---|---|
| 2,170,428 | 8/39 | Richter | 88—57 |
| 2,399,858 | 5/46 | Cox | 88—57 |
| 2,432,387 | 12/47 | Creighton | 88—57 |
| 2,543,856 | 3/51 | Kupka | 88—57 |
| 2,767,614 | 10/56 | Altman | 88—57 |

FOREIGN PATENTS 517,386  1/40  Great Britain.

JEWELL H. PEDERSEN, *Primary Examiner.*